S. N. TEVANDER.
SOLDER APPLYING MACHINE.
APPLICATION FILED DEC. 26, 1916.
1,358,480.
Patented Nov. 9, 1920.
4 SHEETS—SHEET 1.
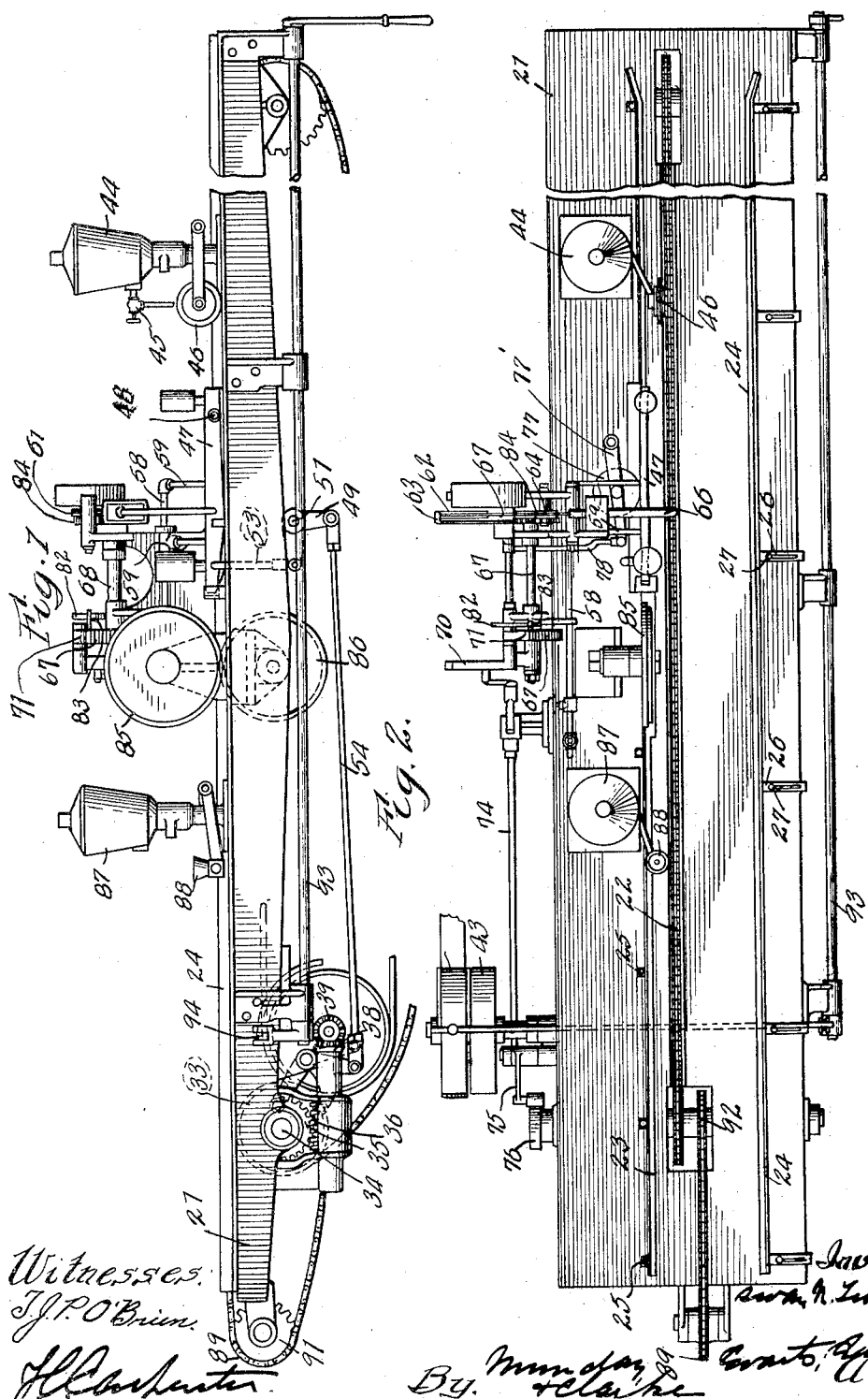

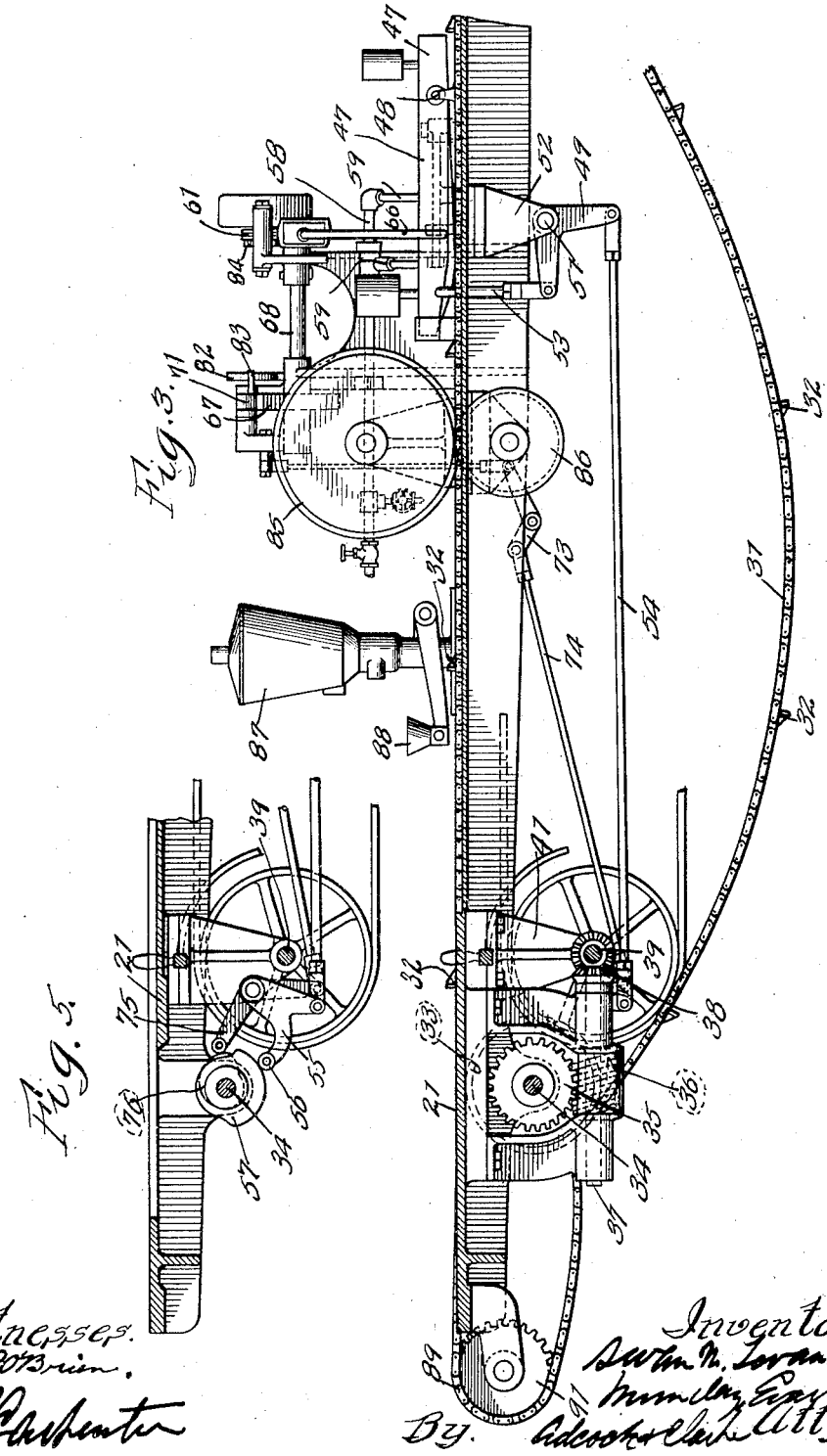

S. N. TEVANDER.
SOLDER APPLYING MACHINE.
APPLICATION FILED DEC. 26, 1916.

1,358,480.

Patented Nov. 9, 1920.
4 SHEETS—SHEET 3.

S. N. TEVANDER.
SOLDER APPLYING MACHINE.
APPLICATION FILED DEC. 26, 1916.
1,358,480.
Patented Nov. 9, 1920.
4 SHEETS—SHEET 4.
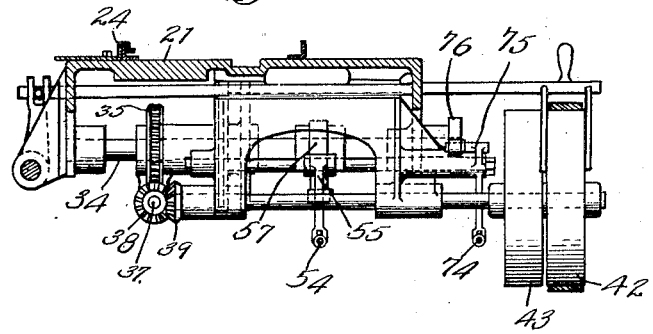
Fig. 6.
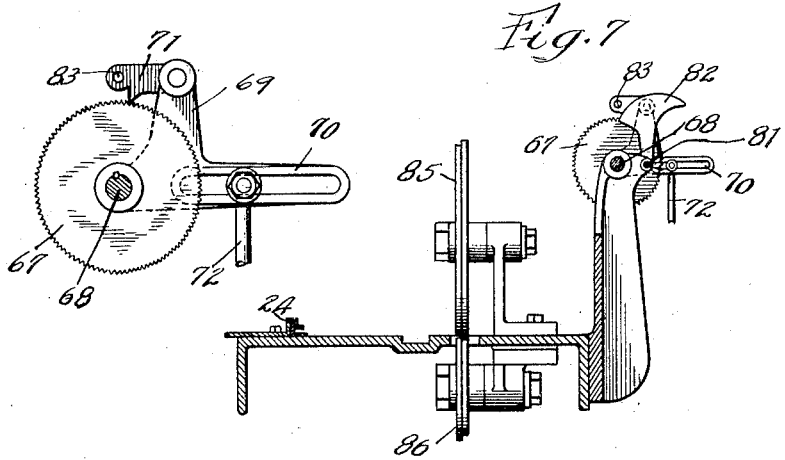
Fig. 9.
Fig. 7.
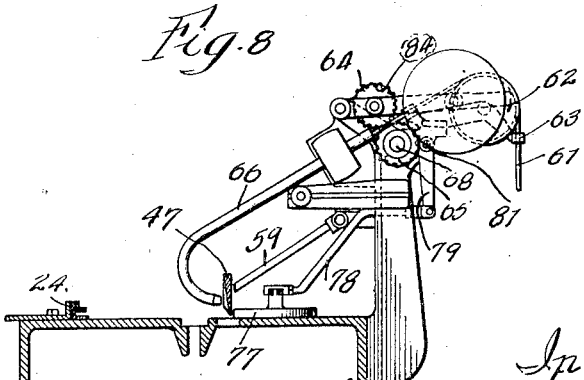
Fig. 8.
Witnesses:
Inventor.

UNITED STATES PATENT OFFICE.

SWAN N. TEVANDER, OF MAYWOOD, ILLINOIS, ASSIGNOR TO AMERICAN CAN COMPANY, OF NEW YORK, N. Y., A CORPORATION OF NEW JERSEY.

SOLDER-APPLYING MACHINE.

1,358,480.   Specification of Letters Patent.   Patented Nov. 9, 1920.

Application filed December 26, 1916.   Serial No. 138,760.

*To all whom it may concern:*

Be it known that I, SWAN N. TEVANDER, a citizen of the United States, residing in Maywood, in the county of Cook and State of Illinois, have invented a new and useful Improvement in Solder-Applying Machines, of which the following is a specification.

This invention relates in general to solder applying machines but has more particular reference to machines provided for the application of solder to the edges of the can body blanks, which are to be folded into the seam either at the side of the body or to be crimped in the flanges of the end closure.

A principal object of this invention is the provision of a well organized and effective machine for the automatic applying of solder to the blank edges as they are conveyed past certain operative parts.

Another object of the invention is the provision of a machine of this character which will operate without wasting solder and without applying more solder than is desirable to the body blanks.

A still further object of the invention is the provision of a machine which will permit the soldered edge to be operatively connected with an adjacent edge through a mere sweating operation after the edges have been placed in the desired relations. In other words, to provide for subsequent soldering without the application of flux material at the time the joint is heated.

Other objects and advantages of the invention will be apparent as it is better understood from the following description when considered in connection with the accompanying drawing illustrating a preferred embodiment thereof.

On the drawing,

Figure 1 is a perspective view of a machine embodying my present invention;

Fig. 2 is a top plan view thereof;

Fig. 3 is a longitudinal vertical section through the same;

Fig. 4 is a an enlarged plan view;

Fig. 5 is a section taken on the lines 5—5 of Fig. 4;

Fig. 6 is a section taken on the lines 6—6 of Fig. 4;

Fig. 7 is a section taken on the lines 7—7 of Fig. 4;

Fig. 8 is a section taken on the lines 8—8 of Fig. 4; and

Fig. 9 is an enlarged side elevation of the ratchet for controlling the solder feed.

For the purpose of illustrating my invention I have shown on the drawing a machine comprising a table 21 supported in any suitable fashion across which continuously moves a conveyer 22 which conveys the blanks during the soldering operation. The blanks are fed in from the right, viewing the figures, and are accurately directed in their movement by guides 23 and 24 extending across the table and on opposite sides of the path of travel of the conveyer. One of these guides 23 is fixed, being held by suitable fastening devices 25 upon the table. The other guide 24 is carried in slotted brackets 26 through the slots of which extend set bolts 27 permitting adjustment of this guide toward and from the guide 23 to render the apparatus usable with can body blanks of differing dimensions. The edge to be soldered travels adjacent the guide 23 and it will be noted therefore that blanks of different lengths can be carried through the machine through the adjustment of the guide 24 and without alterations of the positions of the soldering and fluxing devices, to be presently described.

The conveyer comprises, in the present instance, a chain 31 having a plurality of properly spaced dogs 32 adapted to engage at the rear edge of the can body blanks to cause their advance as the conveyer moves. This conveyer takes over a positively driven pulley or sprocket wheel 33 fixed upon a constantly driven rotating shaft 34 mounted in suitable brackets beneath the delivery end of the table. The shaft 34 has a worm wheel 35 meshing with a worm 36 on a shaft 37 also carried beneath the table. The shaft 37 receives its movement through a bevel gear connection 38 from a shaft 39 mounted in brackets 41 and carrying pulleys 42 and 43, one of the latter being an idle and the other a driving pulley.

The blanks feed in from the right, viewing Figs. 1 and 2, first pass a pre-fluxing device consisting of a tank 44 of fluxing material and adapted to feed the same through a valve 45 on to a fluxing roller 46 which rolls across an edge of the blank and applies the flux. Next the blank arrives at the soldering iron 47 pivoted at 48. This soldering iron is moved vertically into and out of normal position and at pre-determined intervals. The purpose of this movement is to control the delivery of solder to the edge of the can body blank, it being capable of adjustment so that it may apply solder across the entire edge or throughout merely a limited part thereof, it being possible to lower the soldering iron into contact with the blank inwardly of the edge a slight distance and to lift it out of contact just before the rear edge passes under the iron. The mechanism for effecting this comprises a bell crank 49 pivoted at 51 in brackets 52 and connected by a lifting link 53 with the forward edge of the soldering iron. The other arm of the bell crank is connected by a connecting rod 54 with a second bell crank 55, the latter bell crank being provided with a roller 56 adapted to ride upon a cam 57 mounted upon the shaft 34. The dwell of this cam, as may be seen in Fig. 5 is such as to permit the soldering iron to be lowered by gravity on to the can body blank throughout a pre-determined part of the rotation of the shaft 34, which being actuated by the means driving the conveyer, produces the desired timing of the action of the soldering iron. Alteration of this cam or replacing it by another permits adjustment of the soldering iron so that its period of action can be limited as desired. The soldering iron is heated by gas from a pipe 58 having branches 59 for the burners. The solder used in the embodiment of the invention shown on the drawing is of the wire type and means are provided to control its feed, which means will now be described.

The solder wire 61 is taken from any suitable source of supply and is led to an idle roll 62 being guided thereto by an eye 63. From the roll 62 it passes between two positively driven friction rolls 64 and 65 into a guide or pipe 66, which directs it against the soldering iron 47. The action of the rolls 64 and 65 is timed so that solder is delivered periodically and as it may be required. The timing and delivery of the solder is controlled by a ratchet wheel 67 upon a shaft 68 on which shaft the roll 65 is fixed. A bell crank 69 is loosely fulcrumed on the shaft 68 and one arm carries a pawl 71 adapted to engage the ratchet wheel 67 to advance it at each reciprocation of the bell crank. Reciprocatory movement is imparted to the bell crank by a rod 72 connected with its other arm 70, which rod through a bell crank 73, connecting rod 74 and a third bell crank 75 receives action from a cam 76 on shaft 34. The cams 76 and 57 are so arranged that the cam 76 acts slightly in advance of the cam 57 so that solder is fed just before the iron is lowered each time into operative position, and the arm 70 is slotted to permit adjustment of the throw of the pawl.

Means are provided to prevent the feeding of solder when no can body blank passes under the iron and these means in the present instance comprise a member adapted to be moved by the can body blank as it approaches soldering position. This member in the present instance comprises a roller 77 mounted on a lever 77' which is adapted to be swung about its pivot by the action of the blank upon the roller. This lever is connected by an arm 78 with a link 79 on a shaft 81 (Fig 8). The shaft 81 carries a detent 82 mounted alongside the pawl 71 and this pawl has a pin 83 (Fig. 7) adapted to be engaged by the detent 82 to prevent its engagement with the ratchet wheel 67 when no can body is passing under the iron. In other words for the pawl 71 to engage the ratchet 67, the roller 77 must be moved aside by a can body blank. Solder wire feed rolls 64 and 65 have coöperating pinions 84 to cause them both to operate in unison and under the power of the ratchet wheel 67. Two rolls 85 and 86 engage the can edge after it has left the soldering iron to straighten out any warpage there may be and after passing these rolls the blank passes under a second fluxing device to flux the solder edge. This fluxing device comprises tank 87 delivering to a flux applying member 88. After the cans pass this flux applying device they arrive at the end of the travel of the conveyer 31 and are removed from the table by the auxiliary belt or conveyer 89 taking over an idle pulley 91 and a driven pulley 92 on shaft 34.

It is intended that the operator stand at the machine away from the pulleys 42 and 43 and a belt shifting device comprising a shaft 93 engaging a belt shifting arm 94 is provided. It is believed desirable to tilt the table somewhat from end to end, that is to make it a little higher at one end than at the other, in order that gravity may aid in the distribution of the solder.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:

1. In a solder applying machine the combination of, a table, a conveyer movable along said table for conveying can body blanks in the flat, a soldering iron under which said can body blanks are conveyed, means for applying flux to the edge of each can body blank before it reaches the soldering iron, and means for applying solder to said edge.

2. In a solder applying machine the combination of, a table, a conveyer movable over said table for conveying can body blanks in the flat, a soldering iron under which said can body blanks are conveyed, means for supplying solder to said iron, and means for limiting the operation of said soldering iron at predetermined periodic intervals and while the blanks are thereunder.

3. In a solder applying machine the combination of, a table, a conveyer movable across said table for conveying can body blanks in the flat, an elongated soldering iron extending substantially parallel with the table, means for delivering solder to said iron at a predetermined rate, and means for interrupting the delivery of said solder at predetermined periodic intervals.

4. In a solder applying machine the combination of, a table, a conveyer movable across said table for conveying can body blanks in the flat, a soldering iron and fluxing devices located upon each side thereof in the direction of travel of said blanks to apply flux both before and after solder is applied to said blanks by said iron.

5. In a solder applying machine the combination of, a table, a conveyer movable across said table for conveying can body blanks in the flat, a soldering iron, means for applying solder to said iron, and a device operable by the edges of said blanks for interrupting the delivery of solder between successive blanks.

6. In a solder applying machine the combination of, a table, a conveyer movable across said table for conveying can body blanks in the flat, a soldering iron, and means for feeding solder to said iron at the rate of its application to said blanks, and means for interrupting the action of said feeding between successive blanks.

7. In a solder applying machine the combination of, a table, a conveyer movable thereacross for conveying can body blanks in the flat, a horizontally arranged vertically movable soldering iron for applying solder to an edge of said blanks, means for applying solder to said iron, and means for lifting said iron away from operative position between successive blanks.

8. In a solder applying machine the combination of, a table, a conveyer movable thereacross for conveying can body blanks in the flat, a horizontally arranged vertically movable soldering iron, means for supplying solder to said iron, and devices for lowering said iron to operative position when the blank is located therebeneath.

9. In a solder applying machine the combination of, a table, a conveyer movable thereacross for conveying can body blanks in the flat, a horizontally arranged vertically movable soldering iron, means for supplying solder to said iron, and devices for moving said iron to operative position throughout a part of the travel of a blank beneath said iron.

10. In a solder applying machine the combination of, a table, a conveyer movable thereacross for conveying can body blanks in the flat, a horizontally arranged vertically movable soldering iron, means for applying solder to said iron at the rate of its application, and means for interrupting the delivery of the solder and moving said iron to inoperative position between successive blanks.

11. In a solder applying machine the combination of, a table, a conveyer movable continuously thereacross for conveying can body blanks in the flat, a soldering iron for applying solder to an edge of said blanks, and means for supplying solder to said iron.

12. In a machine for applying solder to the edges of sheet metal blanks, the combination of a soldering iron extending along the path to be followed by the edge of the blank, a movable device arranged near the soldering iron and in said path and adapted to be held continuously out of said path by the edge of the blank in one position during the passage of the blank, a guide at the side of said path engaged by the edge of the blank, whereby said edge is maintained in said path, the guide being constructed to allow the said movable device to engage the blank as described, means for feeding solder to said iron, and means controlled by said movable device for stopping the action of said solder-feeding means when the edge of a blank is not following said path.

13. In a solder applying machine the combination of, a table, a soldering iron, means for moving can body blanks over said table and under said soldering iron, a guide for said blanks arranged on said table to leave a lateral open space, a ratchet for feeding wire solder to said iron, an intermittently operating pawl for operating said ratchet, and means comprising a roller acted on by the edges of the blanks and arranged in said space to be actuated by the edges of said blanks for holding said pawl out of engagement except when a can body blank is to be presented to said iron.

14. In a solder applying machine the combination of, a soldering iron elongated in the direction of the movement of the can body blanks and movable at one end toward and from the blanks, a device for feeding solder to said iron, and intermittent controls for said iron and said solder feeding device, the said controls being made operative by the edges of said blanks and feeding solder to said iron slightly in advance of its operation.

15. In a solder applying machine the combination of, a table and conveyer movable thereacross, adjustable guides for the opposite edges of can body blanks carried by said conveyer, and an adjustable soldering iron for feeding solder to an edge of each blank carried by said conveyer.

16. The combination of a flat table adapted to hold can body blanks in the flat, fixed means for guiding the edges of said blanks, a conveyer for moving said blanks along the table, a soldering iron against which said blanks are rubbed by said conveyer, and means for supplying solder to said iron.

17. The combination of a flat table adapted to hold can body blanks in the flat, fixed means for guiding the edges of said blanks, a conveyer for moving said blanks along the table, an elongated soldering iron extended substantially parallel with the table and along the elongated under edge of which the said blanks are rubbed by said conveyer, and means for supplying solder to said iron.

18. The combination of a flat table adapted to hold can body blanks in the flat, fixed means for guiding the edges of said blanks, a conveyer for moving said blanks along the table, an elongated soldering iron extended substantially parallel with the table and pivotally mounted at one end, means for raising and lowering the other end of said iron, and means for supplying solder to said iron.

Signed in the presence of two subscribing witnesses.

SWAN N. TEVANDER.

Witnesses:
M. EDNA BARRY,
ETHEL WOOD.